United States Patent [19]

Pollock

[11] B  3,983,220

[45] Sept. 28, 1976

[54] RECOVERY OF BORIC ACID FROM ION EXCHANGERS

[75] Inventor: Charles W. Pollock, Richland, Wash.

[73] Assignee: The United States of America as represented by the United States Energy Research and Development Administration, Washington, D.C.

[22] Filed: Nov. 7, 1974

[21] Appl. No.: 521,984

[44] Published under the second Trial Voluntary Protest Program on February 17, 1976 as document No. B 521,984.

[52] U.S. Cl. .................................... 423/283; 210/32
[51] Int. Cl.² .......................................... C01B 35/10
[58] Field of Search ................. 423/283; 210/24, 32

[56] References Cited
UNITED STATES PATENTS

| | | | |
|---|---|---|---|
| 2,813,838 | 11/1957 | Lyman et al. | 210/24 X |
| 3,112,996 | 12/1963 | Garbato | 423/283 |
| 3,216,795 | 11/1965 | Brown et al. | 423/283 |
| 3,493,498 | 2/1970 | Abrams et al. | 210/32 |
| 3,567,369 | 3/1971 | Chemtob | 210/32 X |
| 3,856,670 | 12/1974 | Peterson | 210/32 |

FOREIGN PATENTS OR APPLICATIONS

| | | | |
|---|---|---|---|
| 658,970 | 1/1965 | Belgium | 423/283 F |

Primary Examiner—G. O. Peters
Attorney, Agent, or Firm—Dean E. Carlson; Arthur A. Churm; James W. Weinberger

[57] ABSTRACT

The recovery of boric acid from an anion exchange resin is improved by eluting the boric acid with an aqueous solution of ammonium bicarbonate. The boric acid can be readily purified and concentrated by distilling off the water and ammonium bicarbonate. This process is especially useful for the recovery of boric acid containing a high percentage of $^{10}B$ which may be found in some nuclear reactor coolant solutions.

10 Claims, No Drawings

RECOVERY OF BORIC ACID FROM ION EXCHANGERS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the recovery of boric acid from aqueous solutions. More specifically, this invention relates to an improvement in the method for recovering boric acid from an anion exchange resin.

Boron, or more specifically, boron[10] has a high-capture cross section for thermal neutrons and is used as a chemical neutron absorber for "hot to cold" shutdown of some types of nuclear reactors. At present, boric acid which normally contains about 20% $^{10}B$ is the most useful chemical for this purpose, since it has sufficient solubility, is relatively inexpensive and is readily removed. For certain types of reactors, boric acids containing a much higher percentage of $^{10}B$ have been prepared, which are very expensive.

In order for the reactor to go critical and restart, the boric acid must be removed from the main coolant. This can be accomplished by passing the coolant water through an appropriate anion exchange resin especially purified for nuclear applications.

Replacement of the anion exchange resin is expensive and elution of the boric acid from the resin is inefficient or results in contamination of the boric acid which requires additional purification before it can be reused as a nuclear reactor poison.

For example, an aqueous ammonia solution has been suggested as an ideal eluent for the boric acid, since the ammoniacal eluate can be boiled to drive off the ammonia. However, it was found that a 1 N ammonia hydroxide solution was very ineffective in stripping the boric acid and had a high pH which made it undesirable for use with aluminum vessels.

Boric acid held by a strong-base ion exchange resin can be displaced by anions such as chloride, nitrate or sulfate. However, when any of these are present, concentrating the eluate without loss of boric acid is difficult. If, for example, hydrochloric acid is used to strip the boron from the resin, concentrating the solution by distillation is not feasible, as boric acid will volatilize. If sodium or ammonium chloride is used, then a large salt residue will remain in the concentrator with the boric acid and cause an additional difficulty in recovery of the boric acid.

SUMMARY OF THE INVENTION

It has been found that boric acid adsorbed on a strongbase anion exchange resin can be easily recovered and purified by passing an aqueous eluent of ammonium bicarbonate through the resin, thereby eluting the boric acid from the resin in the eluate, and heating the eluate to a temperature sufficient to volatilize and drive off the ammonium bicarbonate, whereby only the boric acid remains in the eluate. The eluate may be heated further to vaporize the water to concentrate or crystallize the boric acid. It has also been found that the addition of a small amount of sodium bicarbonate to the eluate before it is heated will minimize the loss of boric acid during volatilization of the ammonium bicarbonate and vaporization of the water.

It is therefore one object of the invention to provide an improved method for the recovery of boric acid from an aqueous solution.

It is a further object of the invention to provide an improved method for the recovery of boric acid from an anion exchange resin.

It is still a further object of the invention to provide an improved method for the recovery of boric acid from an anion exchange resin from which the boric acid can be quickly and inexpensively purified and concentrated for further use.

Finally it is the object of the invention to provide an improved method for the recovery of boric acid from nuclear reactor cooling water which is rapid and effective and from which the boric acid can be quickly and economically recovered, purified and concentrated for reuse.

DESCRIPTION OF THE PREFERRED EMBODIMENT

These and other objects of the invention may be met by passing an aqueous solution containing boric acid through an anion exchange resin whereby the boric acid is adsorbed on the resin, thereby removing it from the water, passing an eluent consisting of an aqueous solution containing from about 0.2 to about 3.0 M ammonium bicarbonate through the resin bed, thereby eluting the boric acid adsorbed thereon from the bed with the eluate, and heating the eluate to at least about 60°C. to decompose and volatilize the ammonium bicarbonate, whereby only the boric acid remains in the solution. By making the eluate from about 0.025 to about 0.05 M in sodium bicarbonate before it is heated, the loss of some boric acid during this procedure will be prevented. After volatilization of the ammonium bicarbonate, continued heating of the eluate to vaporize the water will concentrate and crystallize the boric acid.

The anion exchange resin is not critical but can be any resin which will adsorb boric acid from an aqueous solution such as a strong-base quaternary ammonium anion exchange resin. An example of such a resin is Duolite A101D manufactured by the Diamond Alkali Company, Western division. This resin has a polystyrene matrix and quaternary ammonium functional groups.

The resin should be in the hydroxyl form before passing the aqueous solution containing the boric acid therethrough. Upon elution of the boric acid the resin may be regenerated with a solution of sodium hydroxide.

The ammonium bicarbonate eluent may vary in strength from about 0.2 to about 3.0 M with 1.0 to 2.0 M being preferred. Concentrations of less than 0.2 M are not an effective eluent and require a number of column volumes to elute the boric acid. Concentrations greater than about 3.0 M are wasteful of ammonium bicarbonate and do not increase elution efficiency.

The eluate may be heated by any effective method as long as the temperature is sufficient to decompose and drive off the ammonium bicarbonate from the eluate. The temperature should be at least about 60°C. and temperatures up to the boiling temperature of water are satisfactory. For a smallscale laboratory testing, distillation of the eluent proved to be very effective to decompose the ammonium bicarbonate and concentrate the boric acid while permitting collection of the distillate to determine boric acid loss.

Ambient temperature was found to be quite satisfactory for elution of the boric acid from the anion exchange resin.

It was found that making the eluate from about 0.025 to 0.05 M in sodium bicarbonate before heating the eluate to decompose the ammonium bicarbonate will help to prevent some loss of boric acid from the eluate.

The following examples are given as illustrations of the process of the invention and are not to be taken as limitations upon the scope and extent of the invention.

EXAMPLE I

To demonstrate elution of boric acid from the anion resin, 200 ml of Duolite 101D anion resin were placed in a column 22 inches long and ⅞ inches in diameter.

This resin has a theoretical capacity of about one mol of anion per liter of resin.

The resin was washed with about one column volume (200 ml) of water. 200 ml of 0.5 M $H_3BO_3$ (6.18 gm) were loaded on the resin.

The bed was then stripped with 200 ml portions of 1 M $NH_4HCO_3$. Five column volumes were used (200 ml each) and the effluents collected separately. A rate of one column volume in 30 minutes was used.

Analyses of the eluate for boron showed recoveries as follows:

| Effluent | No. 1 | 0.0% boron recovery |
|---|---|---|
| | No. 2 | 55.7 |
| | No. 3 | 32.4 |
| | No. 4 | 2.3 |
| | No. 5 | 0.4 |
| | | Total 90.8% |

EXAMPLE II

A column of resin was again loaded as in Example I.

The bed was then stripped with 100 ml portions of 2 M $NH_4HCO_3$. Eight one-half column volumes were used (100 ml each) and the effluents collected separately. A rate of flow of one column volume in 30 minutes was used.

Analyses of the effluent for boron showed recoveries as follows:

| Effluent | No. 1 | 0 |
|---|---|---|
| | No. 2 | 6.78% |
| | No. 3 | 57.13 |
| | No. 4 | 24.07 |
| | No. 5 | 8.90 |
| | No. 6 | 2.40 |
| | No. 7 | 0.84 |
| | No. 8 | 0.13 |
| | | Total 100.25 boron recovery. |

EXAMPLE III

To demonstrate purification and concentration of effluent by distillation, portion No. 2 from Example I, 190 ml in volume, at 17.2 g/l boric acid and so amounting to 3.27 g $H_3BO_3$, was concentrated in a still. The container was rinsed with about 20 ml of water.

1st distillate about 10–20 ml showed < 20 ppm boron
2nd distillate about 18 ml showed < 68 ppm boron
3rd distillate about 5 ml showed < 605 ppm boron The remainder in the distilling flask was placed in an open beaker and allowed to dry, giving a crystalline residue weighing 3.70 g or 113.0% recovery. Possibly some moisture was present or ammonium carbamate may have formed in small amount.

EXAMPLE IV

A more detailed effort was made with portion No. 3 of the effluent from Example I. About 1.9 g boric acid were in the charge of 190 ml.

| Distillate | | | | | | | |
|---|---|---|---|---|---|---|---|
| No. 1, | 50 ml, pH | 9.5, | 26.3% | of volume, | 16.6 | ppm B |
| No. 2, | 26 ml, pH | 9.5, | 13.7 | of volume, | 2.5 | ppm B |
| No. 3, | 27 ml, pH | 10.0, | 14.2 | of volume, | 4.8 | ppm B |
| No. 4, | 26 ml, pH | 9.0, | 13.7 | of volume, | 28 | ppm B |
| No. 5, | 20 ml, pH | 8.0, | 10.5 | of volume, | 72.5 | ppm B |
| No. 6, | 11 ml, pH | 5.2, | 5.8 | of volume, | 132.5 | ppm B |
| | | | 84.2% | | | |
| | | | 15.8% | residue by difference. | | |

Percent loss in distillates:

| No. 1 | 0.25% | in | 26.3% | of distillate volume |
|---|---|---|---|---|
| No. 2 | 0.02 | | 13.7 | |
| No. 3 | 0.04 | | 14.2 | |
| No. 4 | 0.22 | | 13.7 | |
| No. 5 | 0.43 | | 10.5 | |
| No. 6 | 0.43 | | 5.8 | |

*This value believed high due to residue not rinsed from condenser after previous run.

From this a 1.19% loss of boron would occur in distilling off 84% of an ammonium bicarbonate eluate.

EXAMPLE V

To show the effect of the addition of sodium bicarbonate equivalent to the effluent, a boric acid, ammonia bicarbonate, sodium bicarbonate mixture was distilled and boron measured in the distillate.

A solution 200 ml in volume and 1 molar in ammonia bicarbonate, 0.05 molar in boric acid and 0.05 molar in sodium bicarbonate was distilled.

| Distillate | pH | ppm B | Distilled Volume % of Charge | Loss % of Boron Charge |
|---|---|---|---|---|
| No. 1 | 9.5 | 1.08 | 20 | 0.008 |
| No. 2 | 9.3 | 1.18 | 22.5 | 0.01 |
| No. 3 | 8.5 | 1.18 | 25 | 0.01 |
| No. 4 | 6.5 | 20.4 | 25 | 0.19 |
| Residue | | | 7.5 | |

Thus, by making the eluent about 0.05 M in sodium bicarbonate, a 0.2% loss of boron occurred in distilling off 92.5% of the ammonium bicarbonate eluate.

EXAMPLE VI

Another experiment, similar to Example V except that the eluate was made 0.025 M in sodium bicarbonate gave the following results:

| Distillate | pH | ppm B | Distilled Volume % of Charge | Loss % of Boron Charge |
|---|---|---|---|---|
| No. 1 | 9.5 | 1.8 | 20 | 0.008 |
| No. 2 | 9.4 | 2.0 | 24 | .018 |
| No. 3 | 9.0 | 1.8 | 23 | .015 |
| No. 4 | 7.0 | 35.5 | 25 | 0.33 |
| Residue volume as % of charge | | | | 8.0 |

(Note: On standing borax crystallized out.)

Thus by making the eluent about 0.025 M in sodium bicarbonate a 0.36% loss of boron occurred in distilling off 92% of the ammonium bicarbonate eluent.

As can be seen from Examples V and VI, the addition of a small amount of sodium bicarbonate to the effluent before distillation had the desired effect of reducing the loss of boric acid during the distillation step.

The process of the invention provides an improved method for the recovery of boric acid from aqueous solutions, in that recoveries of from about 90 to about 100% of the boric acid are possible. In addition, the boric acid is present in an aqueous solution from which it can be readily and inexpensively purified and concentrated for reuse.

The embodiments of the invention in which an exclusive property or privilege is claimed are defined as follows:

1. In the method for recovering boric acid from an aqueous solution by passing the solution through a strongbase anion exchange resin whereby the boric acid is adsorbed on the resin, the improvement comprising passing an aqueous ammonium bicarbonate eluent through the resin, thereby eluting the boric acid from the resin in the eluate, and heating the eluate to a temperature sufficient to volatilize and drive off the ammonium bicarbonate whereby only the boric acid remains in the solution.

2. The method of claim 1 wherein the eluent is from about 0.2 to 3.0 M in ammonium bicarbonate.

3. The method of claim 2 wherein the eluate is heated to from about 60°C. to 100°C.

4. The method of claim 3 including the further step of continuing to heat the eluate after volatilization of the ammonium bicarbonate to vaporize the water, thereby concentrating and crystallizing the boric acid.

5. The method of claim 4 wherein the eluate is made about 0.025 to 0.05 M in sodium bicarbonate before it is heated.

6. A method for the recovery of boric acid from an aqueous nuclear reactor core coolant solution comprising:
    passing the coolant solution through a strong-base anion exchange resin whereby the boric acid is adsorbed on the resin;
    passing an aqueous ammonium bicarbonate eluent through the resin whereby the boric acid is eluted from the resin in the eluate; and
    heating the eluate to a temperature sufficient to decompose the ammonium bicarbonate whereby the ammonium bicarbonate is volatilized and the boric acid remains in the eluate.

7. The method of claim 5 wherein the eluent is from about 0.2 to 3.0 M in ammonium bicarbonate.

8. The method of claim 6 wherein the eluate is heated to from about 60°C. to 100°C.

9. The method of claim 8 including the further step of continuing to heat the eluate after volatilization of the ammonium bicarbonate to vaporize the water, thereby concentrating and crystallizing the boric acid.

10. The method of claim 7 wherein the eluate is made about 0.025 to 0.05 M in sodium bicarbonate before it is heated.

* * * * *